(12) United States Patent
Labuschagne et al.

(10) Patent No.: US 8,717,725 B2
(45) Date of Patent: May 6, 2014

(54) DUAL-COMPARATOR RESTRICTED EARTH FAULT PROTECTION

(75) Inventors: Casper A. Labuschagne, Pullman, WA (US); Steven Chase, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 770 days.

(21) Appl. No.: 12/959,203

(22) Filed: Dec. 2, 2010

(65) Prior Publication Data

US 2012/0140365 A1 Jun. 7, 2012

(51) Int. Cl.
*H02H 3/00* (2006.01)

(52) U.S. Cl.
USPC .............................. 361/80; 361/42

(58) Field of Classification Search
USPC ........................................ 361/80, 42
See application file for complete search history.

(56) References Cited

U.S. PATENT DOCUMENTS

| | | | |
|---|---|---|---|
| 4,204,237 A | 5/1980 | Zocholl | |
| 4,402,028 A | 8/1983 | Udren | |
| 4,758,774 A | 7/1988 | Crawford | |
| 4,825,326 A | 4/1989 | Andow | |
| 4,841,405 A | 6/1989 | Udren | |
| 5,115,226 A | 5/1992 | Schweitzer | |
| 5,276,402 A | 1/1994 | Schucht | |
| 5,367,426 A | 11/1994 | Schweitzer, III | |
| 5,602,707 A | 2/1997 | Schweitzer | |
| 5,671,112 A | 9/1997 | Hu | |
| 5,703,745 A | 12/1997 | Roberts | |
| 5,784,233 A | 7/1998 | Bastard | |
| 5,790,357 A | 8/1998 | Schiel | |
| 5,796,258 A | 8/1998 | Yang | |
| 5,805,395 A | 9/1998 | Hu | |
| 5,963,404 A | 10/1999 | Guzman-Casillas | |
| 6,011,480 A | 1/2000 | Schweitzer | |
| 6,148,267 A | 11/2000 | Premerlani | |
| 6,256,592 B1 | 7/2001 | Roberts | |

(Continued)

FOREIGN PATENT DOCUMENTS

| | | |
|---|---|---|
| GB | 2 362 275 A | 11/2001 |
| GB | 2362275 | 11/2001 |
| WO | 2005064759 | 7/2005 |

OTHER PUBLICATIONS

Demetrios A. Tziouvaras, Jeff Roberts, and Gabriel Benmouyal, Schweitzer Engineering Laboratories, Inc., New Multi-Ended Fault Location Design for Two- or Three-Terminal Lines, Nov. 1, 2004.

(Continued)

*Primary Examiner* — Ronald W Leja
(74) *Attorney, Agent, or Firm* — Jared L. Cherry; Richard M. Edge (57) ABSTRACT

An intelligent electronic device may provide restricted earth fault protection to components of an electrical power delivery system using both an amplitude comparator and a phase angle comparator configured to independently detect faults. The IED may include selection logic configured to select the output of one of the phase angle comparator and the amplitude comparator, to the exclusion of the other, based on system conditions. Accordingly, when system conditions are such that a phase angle comparator is better suited to detect a fault, selection logic may select the output of the phase angle comparator. Similarly, when system conditions are such that an amplitude comparator may better detect a fault, selection logic may select the output of the amplitude comparator. A protection system may further include an in-zone fault detector configured to detect in-zone faults.

20 Claims, 10 Drawing Sheets

(56) References Cited

U.S. PATENT DOCUMENTS

| | | | |
|---|---|---|---|
| 6,341,055 | B1 | 1/2002 | Guzman-Casillas |
| 6,356,421 | B1 | 3/2002 | Guzman-Casillas |
| 6,411,865 | B1 | 6/2002 | Qin |
| 6,456,947 | B1 | 9/2002 | Adamiak |
| 6,483,680 | B1 | 11/2002 | Kulidjian |
| 6,507,184 | B1 | 1/2003 | Elston |
| 6,518,767 | B1 | 2/2003 | Roberts |
| 6,525,543 | B1 | 2/2003 | Roberts |
| 6,573,726 | B1 | 6/2003 | Roberts |
| 6,590,397 | B2 | 7/2003 | Roberts |
| 6,670,721 | B2 | 12/2003 | Lof |
| 6,721,671 | B2 | 4/2004 | Roberts |
| 6,785,105 | B2 | 8/2004 | Roberts |
| 6,841,976 | B1 | 1/2005 | Sen |
| 6,879,917 | B2 | 4/2005 | Turner |
| 7,196,884 | B2 | 3/2007 | Guzman-Casillas |
| 7,279,905 | B2 | 10/2007 | Cvorovic |
| 7,319,576 | B2 | 1/2008 | Thompson |
| 7,345,863 | B2 | 3/2008 | Fischer |
| 7,400,150 | B2 | 7/2008 | Cannon |
| 7,425,778 | B2 | 9/2008 | Labuschagne |
| 7,472,026 | B2 | 12/2008 | Premerlani |
| 7,812,615 | B2 | 10/2010 | Gajic |
| 2002/0145841 | A1 | 10/2002 | Williams |
| 2002/0149893 | A1 | 10/2002 | Kurosawa |
| 2004/0021995 | A1 | 2/2004 | Roberts |
| 2005/0201130 | A1 | 9/2005 | Tarkiainen |
| 2006/0176631 | A1 | 8/2006 | Cannon |
| 2006/0198073 | A1 | 9/2006 | Cvorovic |
| 2007/0021937 | A1 | 1/2007 | Labuschagne |
| 2007/0035902 | A1 | 2/2007 | Schweitzer |
| 2007/0070565 | A1 | 3/2007 | Benmouyal |
| 2008/0088466 | A1 | 4/2008 | Labuschagne |
| 2008/0130179 | A1 | 6/2008 | Gajic |
| 2009/0086388 | A1 | 4/2009 | Shin |
| 2009/0091867 | A1 | 4/2009 | Guzman-Casillas |
| 2011/0216451 | A1* | 9/2011 | Haines et al. .......... 361/42 |
| 2011/0216452 | A1* | 9/2011 | Haines et al. .......... 361/42 |
| 2011/0216453 | A1* | 9/2011 | Haines et al. .......... 361/49 |
| 2012/0140365 | A1* | 6/2012 | Labuschagne ........ 361/47 |

OTHER PUBLICATIONS

Gabriel Benmouyal, Schweitzer Engineering Laboratories, Inc., The Trajectories of Line Current Differential Faults in the Alpha Plane, Sep. 22, 2005.

Debra Carroll and John Dorfner, Tacoma Power, Tony Lee and Ken Fodero, Schweitzer Engineering Laboratories, Inc., Chris Huntley, GE Lentronics, Resolving Digital Line Current Differential Relay Security and Dependability Problems: A Case History, 29th Annual Western Protective Relay Conference, Spokane Washington, Oct. 22-24, 2002.

Gabriel Benmouyal, Joe B. Mooney, Schweitzer Engineering Laboratories, Inc., Advanced Sequence Elements for Line Current Differential Protection, 2006.

GE Industrial Systems L90, Line Current Differential System, UR Series Instruction Manual, Section 8, Manual P/N:1601-0081-T1(GEK-113488) L90 Revision 5.6x, Section 8, 2009.

Yonghong Chen, Midwest ISO, Indianapolis IN, Xing Liu and Vaithianathan "Mani" Venkatasubramanian, School of EECS, WSA, Pullman, WA, IEEE; 41st Hawaii International Conference on System Sciences, Fast Algorithms for Detecting Circular VAR Flows in Large Power-Flow Models, 2008.

Xiangning Lin, Qing Tian, Pei Liu, The Self-Adaptation Compensated Differential Protection of Powerformer, The Department of Electrical Engineering, Huazhong University of Science and Technology (HUST).

Walter A. Elmore, Ways to Assure Improper Operation of Transformer Differential Relays, Consulting Engineer, ABB Power T&D Co., Inc., Coral Spring Florida, Presented to the Forty-Fifth Annual Conference for Protective Relaying Engineering at the Georgia Institute of Technology, Atlanta, Georgia, May 1-3, 1991.

Gerald Dalke, Solutions for Unconventional CT Connections, Basler Electric Company, presented before the 59th Annual Georgia Tech Protective Relaying Conference,Atlanta Georgia, Apr. 27-29, 2005.

Mike Young, John Horak, Commissioning Numerical Relays, Basler Electric Company.

Zoran Gajic, Igor Ivankovic, Bozidar Filipovic-Grcic, Renata Rubesa, New Method for Differential Protection of Phase Shifting Transformers, Sep. 6, 2006.

Casper Labuschagne, Normann Fischer, Transformer Fault Anaylsis Using Event Oscillography, Sep. 15, 2006.

Tziouvaras, Demitrios A., Protecting a 138KV Phase Transformer EMTP Modeling and Model Power System Testing, Nov. 2002.

Zoran Gajic, Ivo Brncic, Birger Hillstrom, Fahrudin Mekic, Igor Ivankovic, Sensitive Turn-to-Turn Fault Protection for Power Transformers, 2005.

Ivo Brncic, Zoran Gajic, Torbjorn Einarsson, Transformer Differential Protection Improved by Implementation of Negative-Sequence Currents, ABB Power Technologies, 2006.

Schweitzer Engineering Laboratories, Inc., SEL-787 Transformer Protection Relay, Jul. 4, 2008.

Schweitzer Engineering Laboratories, Inc., SEL-487E Transformer Differential Relay; Three-Phase Transformer Protection, Automation and Control System, Jul. 29, 2008.

Zoran Gajic, ABB Power Technologies AB Sweden; Igor Ivankovic, Bozidar Filipovic-Grcic, Renata Rubesa, Utility experience and case studies, New Method for Differential Protection of Phase Shifting Transformers, HEP-Transmission System Operator Croatia, PSP 2006.

Casper Labuschagne, Normann Fischer, Schweitzer Engineering Laboratories, Inc., Transformer Fault Analysis Using Event Oscillography; TP6259-01, Sep. 15, 2006.

PCT/US11/62913 Patent Cooperation Treaty, International Search Report and Written Opinion of the International Searching Authority, Apr. 6, 2012.

* cited by examiner

DUAL-COMPARATOR RESTRICTED EARTH FAULT PROTECTION

TECHNICAL FIELD

This disclosure generally relates to systems and methods for providing fault protection to an electrical power delivery system. More particularly, various embodiments of a fault protection system disclosed herein include a phase angle comparator and an amplitude comparator, together with selection logic configured to select the output of one of the phase angle comparator and the amplitude comparator to the exclusion of the other.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure includes various embodiments of systems and methods for providing restricted earth fault ("REF") protection. Various embodiments may include an amplitude comparator and a phase angle comparator, together with selection logic to detect a fault using either the amplitude comparator or the phase angle comparator, based upon electrical conditions. The amplitude comparator may be better suited to detect high-impedance faults (e.g., faults that occur when current transformers are heavily loaded) than phase angle comparators. Further, the phase angle comparators may not accurately calculate a phase angle useful for detecting a fault if the neutral line has a fault and the current on a phase line is below a certain limit. The phase angle comparators are better suited to detect faults when current transformers are saturated. A saturated current transformer provides little or no output to the relay, and typically only occurs during fault conditions. In contrast, a current transformer on a heavily loaded power system (a power system that is operating near its full capacity) does not typically saturate. The full capacity of a power system may be a factor of approximately 20 less than a fault current.

Various systems according to the present disclosure may utilize either the amplitude comparator and or the phase angle comparator, depending on which comparator is better able to detect a fault under existing conditions. For example, when system conditions are such that a phase angle comparator is better suited to detect a fault, the selection logic enables the phase angle comparator to the exclusion of the amplitude comparator. Similarly, when system conditions are such that an amplitude comparator may better detect a fault, the selection logic enables the amplitude comparator to the exclusion of the phase angle comparator. In various embodiments, the REF protection may be used in place of, or in conjunction with, differential fault detection devices.

According to various embodiments, REF protection systems may also provide in-zone fault protection against high-impedance faults. In-zone fault protection may ensure that the amplitude comparator is used to detect faults during periods of heavy load. During periods of heavy load, the phase angle comparator may not measure significant phase deviation on the phase lines. According to one embodiment, in-zone fault protection indicates a fault when the amplitude comparator indicates a fault and the current load on the phase lines is between a minimum threshold and maximum threshold. Additionally, in-zone fault protection may indicate a fault when an amplitude comparator indicates a fault and a phase line is between a minimum and a maximum threshold.

Electric power generation, transmission, and delivery systems may utilize intelligent electronic devices (IEDs) to monitor distribution lines and other electrical equipment to detect faults. IEDs may be configured to monitor voltage transformers and associated distribution lines and/or generators. IEDs may further be configured to issue control instructions to monitored equipment upon the detection of a fault.

Some embodiments may include a buffer or a hold timer that is associated with the selection logic and/or the in-zone fault detector in order to ensure that transitory signals are not immediately output to a control device or control system. Any of a variety of timers or buffers may be used to ensure that a signal is held for a predetermined amount of time before being output. For example, a timer may include a stair-step timer, a conditional timer, a counter, or other timer configured to ensure a signal is held for a predetermined amount of time.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, an "embodiment" may be a system, a method, or a product of a process.

Some of the infrastructure that can be used with embodiments disclosed herein is already available, such as: general-purpose computers, computer programming tools and techniques, digital storage media, and communications networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer-readable storage device such as non-volatile memory, static RAM, dynamic RAM, ROM, CD-ROM, disk, tape, magnetic, optical, flash memory, or other computer-readable storage medium.

As used herein, the term IED may refer to any processor-based device that monitors, controls, automates, and/or protects monitored equipment within the system. Such devices may include, for example, phase angle comparators, amplitude comparators, voltage and/or current comparators, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may be connected to a network, and communication on the network may be facilitated by networking devices including but not limited to multiplexers, routers, hubs, gateways, firewalls, and switches, each of which may also be considered an IED.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody a program, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

In the following description, numerous details are provided to give a thorough understanding of various embodiments; however, the embodiments disclosed herein can be practiced without one or more of the specific details, or with other methods, components, materials, etc. In other instances, well-known structures, materials, or operations are not shown or described in detail to avoid obscuring aspects of this disclosure.

Figure 1:
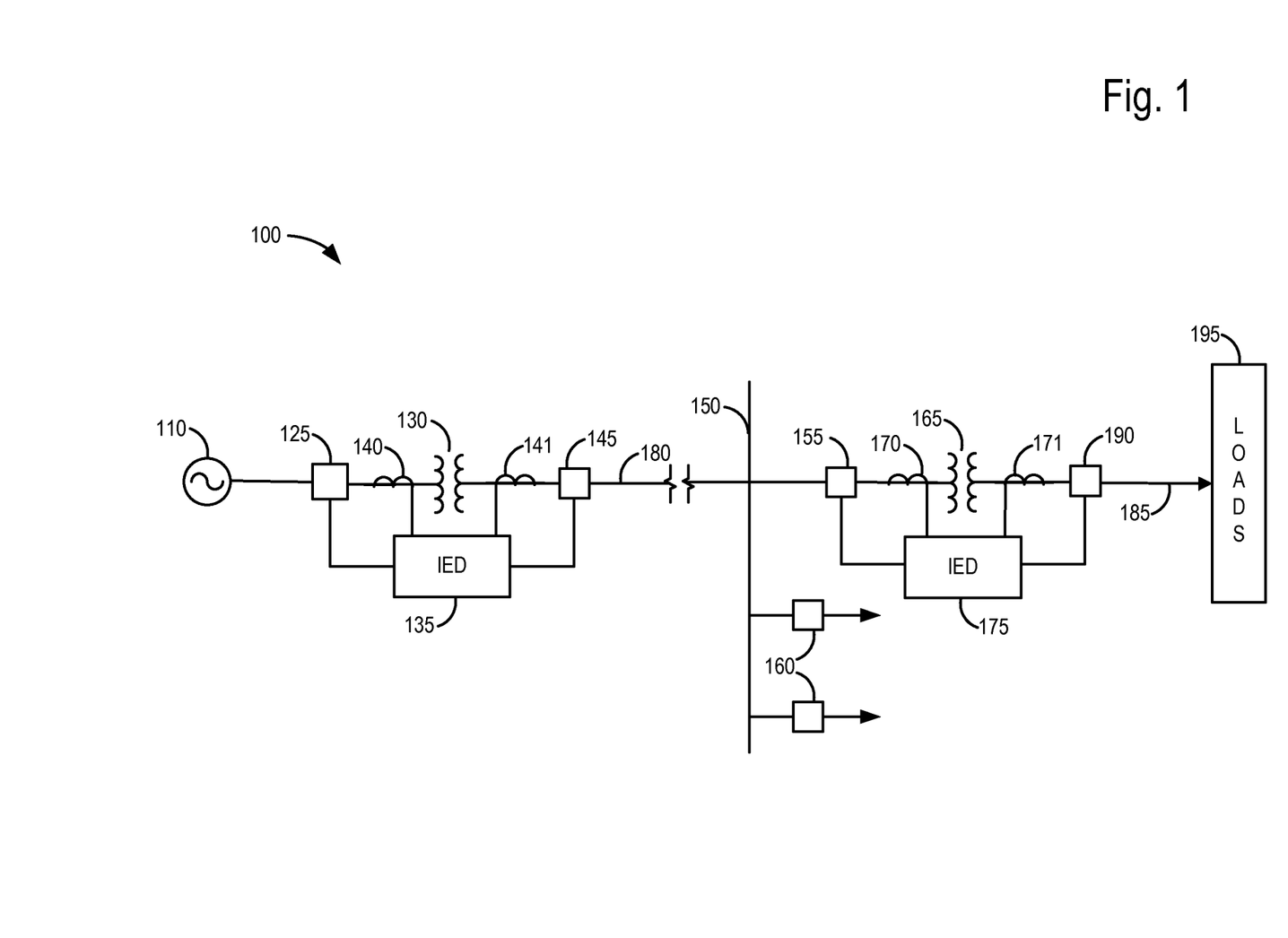
FIG. 1 is a diagram of one embodiment of an electrical power delivery system including a plurality of intelligent electronic devices (IEDs).

FIG. 1 illustrates a diagram of an exemplary electrical power delivery system 100. Electrical power delivery system 100 includes IEDs 135 and 175, which are configured to monitor, protect, and/or control other components of electrical power delivery system 100. For example, IED 135 may be configured to monitor a voltage transformer 130 connected to a generator 110.

According to various embodiments, electrical power delivery system 100 may generate, transmit, and distribute three-phase power. Alternatively, electrical power delivery system 100 may be adapted to accommodate any number of phases, including single phase, two-phase, three-phase with a neutral line, three-phase without a neutral line, or a combination thereof. An IED may protect and/or monitor a wye-delta or delta-wye transformer used to interconnect various portions of an electrical power delivery system. While the remainder of the description refers to a three-phase electrical power delivery system that includes a neutral line, the teachings of the disclosure are applicable an electrical power delivery system having any number of phases.

A step-up voltage transformer 130 may be configured to increase the voltage generated by generator 110. IED 135 may be connected to voltage transformer 130 via current transformers 140 and 141. As described in greater detail below, IED 135 may be configured to provide REF protection to voltage transformer 130 using both a phase angle comparator and an amplitude comparator. IED 135 may control a breaker 125 and a breaker 145, using which IED 135 may electrically isolate voltage transformer 130 from other portions of electrical power delivery system 100. A transmission line 180 may transmit electrical power from a power generation location to a location proximate to one or more loads.

A distribution bus 150 may connect to transmission line 180, and various branches of electrical power delivery system 100 may be selectively connected and disconnected using breakers, such as breaker 155 and breakers 160. A step-down voltage transformer 165 may be used to decrease the voltage of electric power transmitted via distribution bus 150 for distribution via distribution line 185 to various loads 195.

IED 175 may monitor and provide REF protection to voltage transformer 165. IED 175 may monitor voltage transformer 165 via current transformers 170 and 171. In alternative embodiments, voltage transformers (not shown) may provide input to IED 175. In the event of a fault, IED 175 may detect the fault and issue a control instruction to open one or more breakers, in order to electrically isolate the fault. In the event of a fault, IED 175 may actuate breakers 155 and 190 in order to electrically isolate voltage transformer 165. Additional IEDs (not shown) may be used to monitor and protect other branches of electrical power delivery system 100.

Figure 2A:
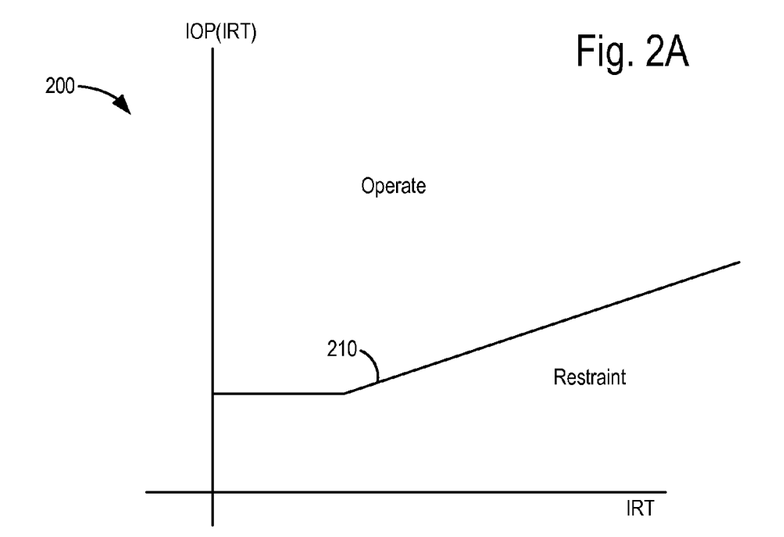
FIG. 2A illustrates the operating characteristics of one embodiment of an amplitude comparator.
Figure 2B:
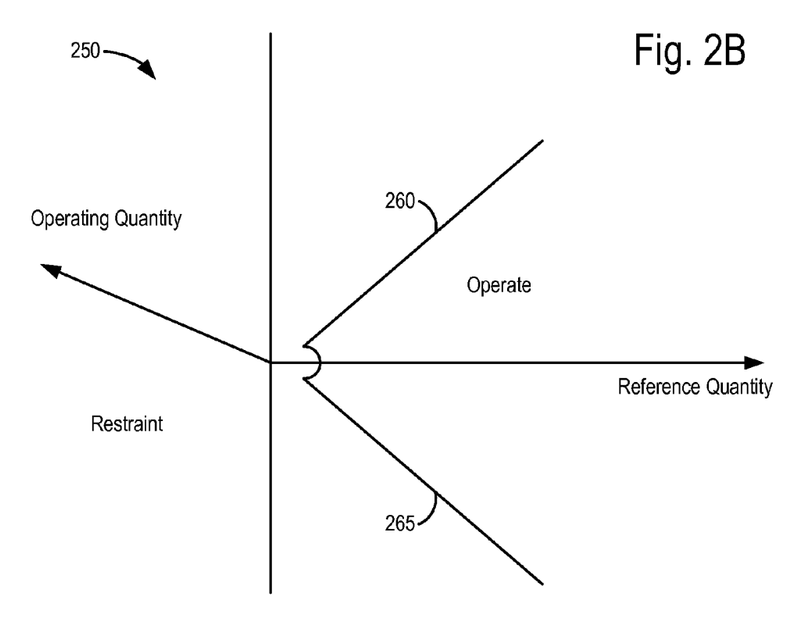
FIG. 2B illustrates the operating characteristics of one embodiment of a phase angle comparator.

According to various embodiments, IEDs 135 and 175 may utilize both an amplitude comparator and a phase angle comparator to provide REF protection to components, such as transformers 130 and 165, of electrical power delivery system 100. IEDs 135 and 175 may include selection logic to selectively enable either the amplitude comparator or the phase angle comparator, to the exclusion of the other. Depending on the system conditions, one comparator may be better suited to detect a fault than the other. FIGS. 2A and 2B illustrate the characteristics of an amplitude comparator and a phase angle comparator, respectively.

FIG. 2A illustrates the operating characteristics 200 of one embodiment of an amplitude comparator. An embodiment of an amplitude comparator having the operating characteristics illustrated in FIG. 2A may compare an operating current and a restraint current. The x-axis corresponds to the restraint current, and the y-axis corresponds to a function of the restraint current, which is expressed as IOP(IRT). According to various embodiments, the amplitude comparator indicates a fault if IOP(IRT) exceeds a limit 210.

According to the illustrated embodiment, limit 210 remains a constant IOP(IRT) level until the restraint current IRT reaches a predetermined value, after which it continues on an upward slope. Alternatively, limit 210 may be expressed as any type of function of the restraint current IRT. In other words, an amplitude comparator may indicate a fault when a specified function of the operating current IOP and the restraint current IRT exceeds or is below a predetermined limit.

FIG. 2B illustrates the operating characteristics of one embodiment of a phase angle comparator. According to various embodiments, phasors representing one or more of the phase lines and/or a neutral line of an electrical power delivery system may be compared to one another or to a threshold phasor to determine if a fault is present. The zero-sequence current vector from two phase lines and the current vector from a neutral line may be compared to determine if a fault is present. If the real part of the product of the vector zero-sequence current from two phase lines multiplied by the vector current from a neutral line is not within a predetermined range of phases, the phase angle comparator may indicate a fault. The graph 250 of FIG. 2B illustrates an exemplary maximum phase deviation limit 260 and an exemplary minimum phase deviation limit 265. For example, a phase angle comparator may indicate a fault if the phase of the zero-sequence current vector for the phase lines in a multi-phase power system deviates beyond a predetermined limit, in either the positive or negative direction, from the phase of the neutral line.

A reference quantity, as the term is utilized herein, is a value that has predictable attributes under expected power system conditions. For example, the illustration in FIG. 2B may represent a flow of current from ground through a neutral line of a wye/delta transformer. By contrast, the attributes of the operating quantity may lack the predictability of a reference quantity; however, the attributes of the operating quantity and the reference quantity are predictable with respect to each other. The area designated as "restraint" in FIG. 2B, indicates a restraint area. Whether a system functions in the "operate" region or the "restraint" region depends on where an operating quantity and a reference quantity are located. If the operating quantity falls within the restraint area, while the reference quantity is within the operate area (i.e., the two quantities are in different areas), the system restrains. To operate, both the operating quantity and the reference quantity must be located in the operate area.

Figure 3A:
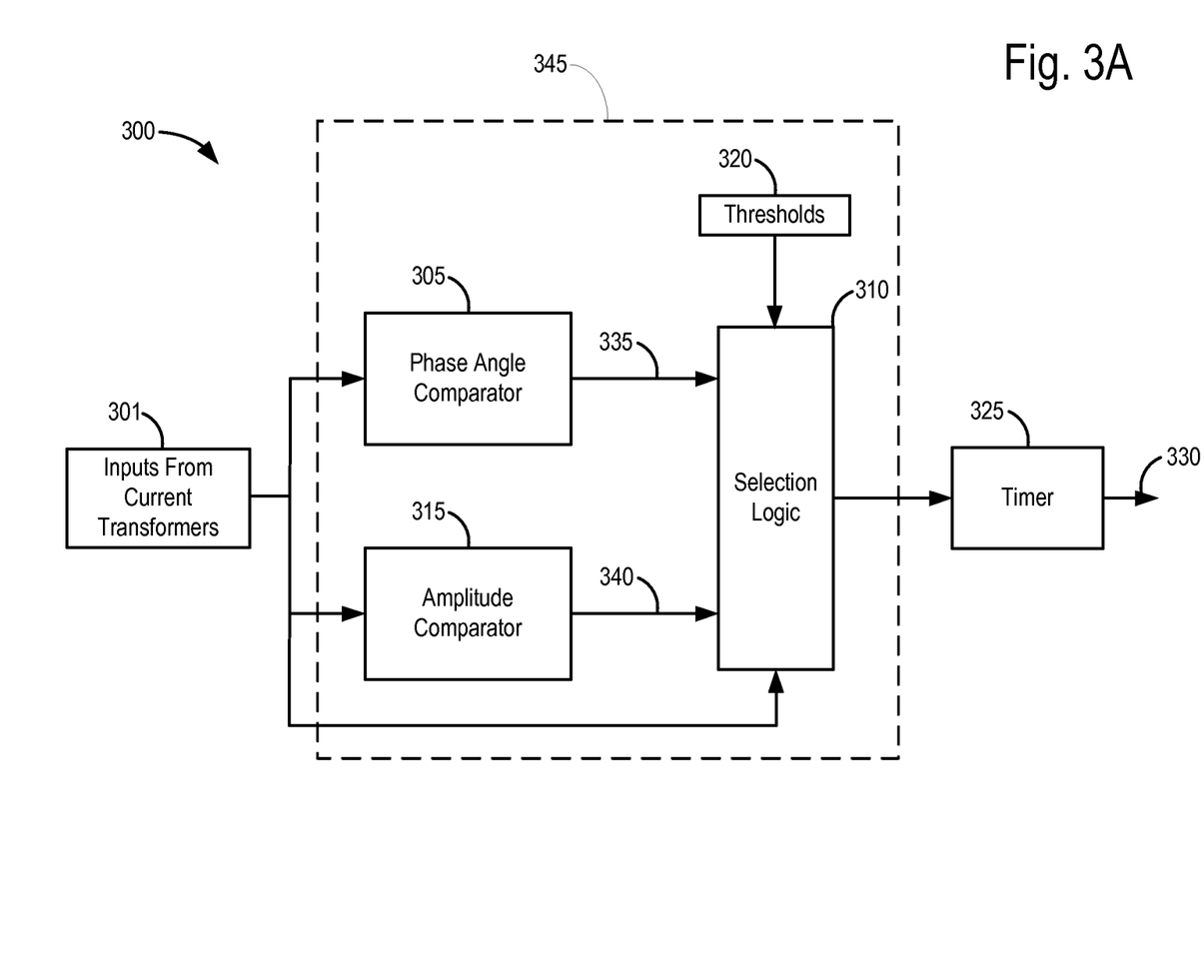
FIG. 3A illustrates a block diagram of one embodiment of a dual-comparator earth fault protection system including a phase angle comparator, an amplitude comparator, and selection logic.

FIG. 3A illustrates an exemplary block diagram of one embodiment of an REF detection system 300. Fault detection system 300 includes a dual-comparator earth fault protection sub-system 345 that includes a phase angle comparator 305, an amplitude comparator 315, and selection logic 310. Earth fault protection system 300 may be a part of an IED. According to various embodiments, both phase angle comparator 305 and amplitude comparator 315 receive inputs 301 from at least one current transformer. According to alternative embodiments, phase angle comparator 305 and amplitude comparator 315 receive inputs 301 from at least one voltage transformer. According to various embodiments, phase angle comparator 305 may be configured to compare the zero-sequence current vector with the current vector of a neutral line. According to various alternative embodiments, phase angle comparator 305 may utilize the negative-sequence, positive-sequence, and/or zero-sequence current vectors of the phase lines and/or neutral line(s). Alternatively, phase angle comparator 305 may compare voltage vectors of the phase lines and neutral line(s) instead of current vectors. According to alternative embodiments not including a neutral line, the negative-sequence, positive-sequence, and/or zero-sequence vectors of various phase lines may be compared.

Phase angle comparator 305 may indicate a fault when the difference between the zero-sequence current vector of the phase lines and the current vector of the neutral line exceeds a predetermined limit. Amplitude comparator 315 may indicate a fault when the restraint current, as a function of the operating current, exceeds a predetermined limit. An output signal 335 of phase angle comparator 305 may indicate whether phase angle comparator 305 detects a fault. Similarly, an output signal 340 of amplitude comparator 315 may indicate whether amplitude comparator 315 detects a fault. Outputs 335 and 340 may be received by selection logic 310.

Selection logic 310 may be configured to select one of outputs 335 and 340 to the exclusion of the other, based on the system conditions. For example, according to various embodiments, selection logic 310 receives inputs 301 from current transformers and compares the inputs 301 to thresholds 320. If inputs 301 are within ranges specified by thresholds 320, selection logic 310 transmits output 335 of phase angle comparator 305 to timer 325. Thresholds 320 may represent a ratio of a measured current to a nominal current or an absolute measured current. If inputs 301 are outside of the ranges specified by thresholds 320, selection logic 310 may determine output 340 of amplitude comparator 315 is better suited to detect a fault. According to various embodiments, timer 325 is configured to ensure that a signal transmitted by selection logic 310 is held for a predetermined amount of time prior to being output 330 to other system components, such as another IED that generates control instructions or a breaker.

Figure 3B:
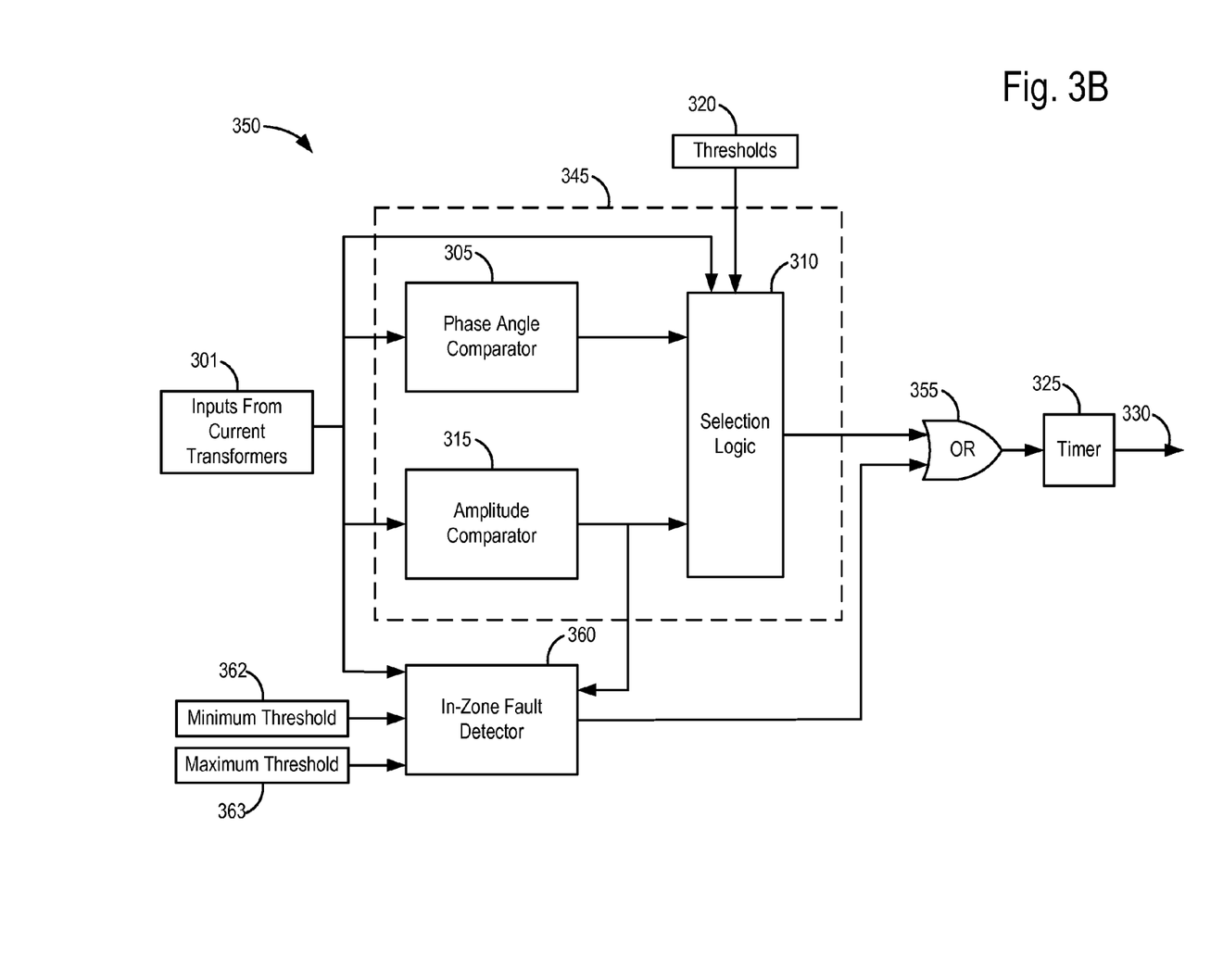
FIG. 3B illustrates a block diagram of an exemplary dual-comparator earth fault protection system including a phase angle comparator, an amplitude comparator, an in-zone fault detector, and selection logic.

FIG. 3B illustrates a block diagram of one embodiment of a fault protection system 350 including dual-comparator REF protection sub-system 345 and an in-zone fault detector 360. If a fault is detected by dual-comparator earth fault protection sub-system 345, selection logic 310 may transmit an output signal to OR gate 355.

In-zone fault detector 360 may receive inputs from current transformers 301 a minimum threshold 362, a maximum threshold 363, and the output signal of amplitude comparator 315. According to one embodiment, in-zone fault detector 360 transmits a signal indicating a fault to OR gate 355 when amplitude comparator 315 indicates a fault and inputs from current transformers 301 are between minimum threshold 362 and maximum threshold 363. According to various embodiments, positive-sequence, negative-sequence, zero-sequence, and/or other current vectors of the phase lines and/or the neutral lines may be utilized when comparing minimum 362 and maximum 363 thresholds to inputs 301.

As illustrated in FIG. 3B, OR gate 355 receives a signal from each of dual-comparator earth fault protection sub-system 345 and in-zone fault detector 360. If either signal received by OR gate 355 indicates a fault, then a signal indicating a fault may be transmitted to timer 325. Timer 325 may be configured to ensure that a signal transmitted by OR gate 355 is held for a predetermined amount of time prior to being output 330 to other system components, such as another IED or a breaker.

Figure 4A:
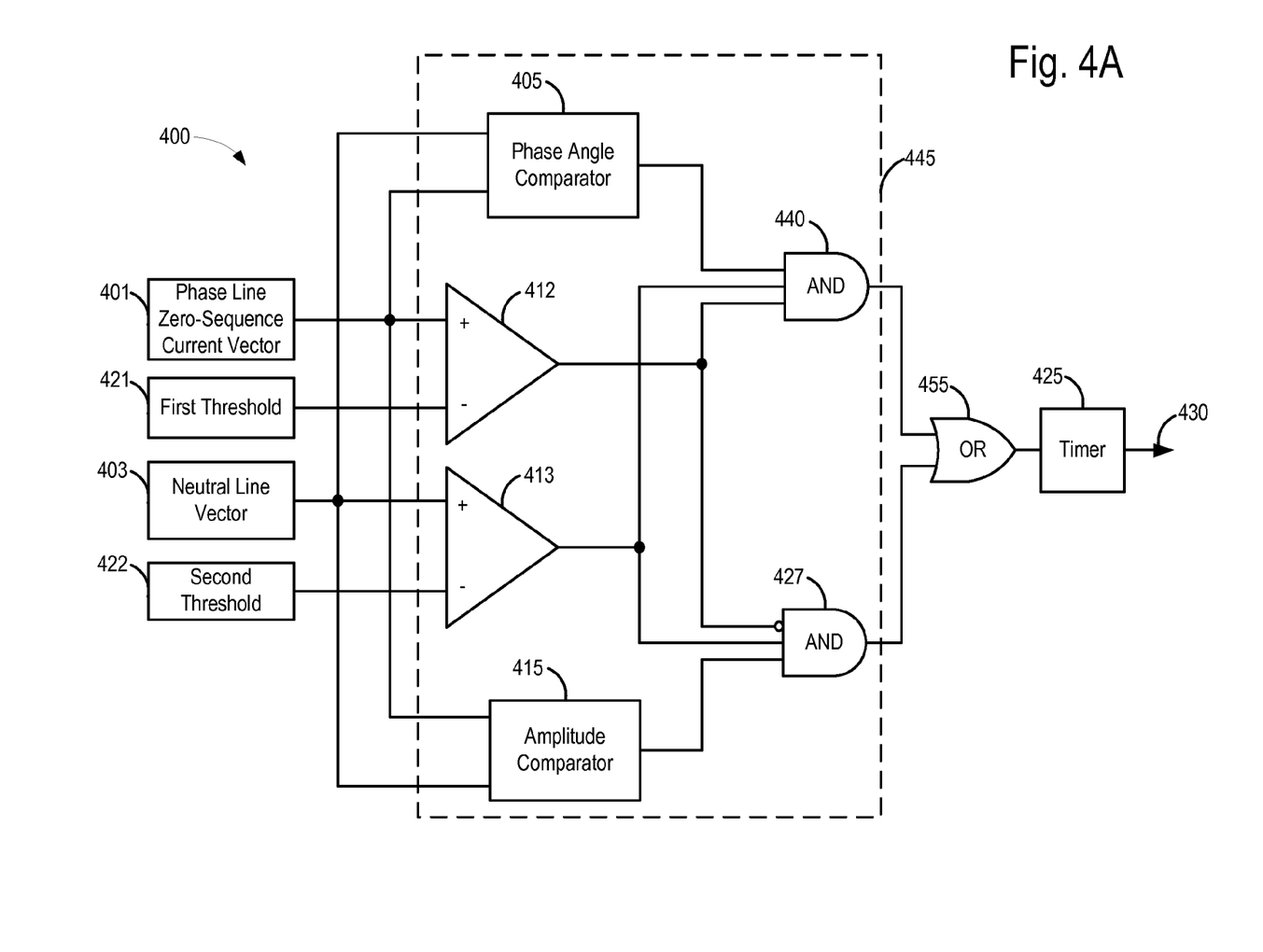
FIG. 4A illustrates one embodiment of a circuit diagram of a dual-comparator earth fault protection system, including a phase angle comparator and an amplitude comparator.

FIG. 4A illustrates a block diagram of one embodiment of a dual-comparator REF protection system 400 including an REF protection subsystem 445. Earth fault protection subsystem 445 includes a phase angle comparator 405 and an amplitude comparator 415. According to the illustrated embodiment, phase angle comparator 405 receives a zero-sequence current vector 401 input and a neutral line vector 403 input from current transformers associated with an electrical power delivery system. According to various alternative embodiments voltages may be utilized and compared instead of currents. Additionally, portions of REF protection system 400 may be adapted to utilize positive-sequence and/or negative-sequence current vectors rather than zero-sequence current vectors. Amplitude comparator 415 may also receive zero-sequence current vector 401 and neutral line 403 vector inputs. Phase angle comparator 405 and amplitude comparator 415 may each independently determine if a fault is present in an electrical power delivery system using the zero-sequence current vector 401 input and neutral line 403 input, respectively.

According to the illustrated embodiment, the output signal, indicating whether a fault is detected, of phase angle comparator 405 is transmitted to AND gate 440. Similarly, the output signal, indicating whether a fault is detected, of amplitude comparator 415 is transmitted to AND gate 427. AND gate 440 may output a signal indicating a fault when phase angle comparator 405 indicates a fault, the output of comparator 412 is positive, and the output of comparator 413 is positive. Comparator 412 is positive when zero-sequence current vector 401 is above a predetermined first threshold 421. Comparator 413 is positive when neutral line vector 403 is above a predetermined second threshold 422. Thus, AND gate 440 may transmit a signal indicating a fault to OR gate 455 only when zero-sequence current vector 401 is above first threshold 421, neutral line vector 403 is above second threshold 422, and phase angle comparator 405 detects a fault.

AND gate 427 may output a signal indicating a fault when amplitude comparator 415 indicates a fault, comparator 413 is positive, and comparator 412 is negative. According to one embodiment, given that AND gate 427 is inversely connected to the output of comparator 412 and AND gate 440 is directly connected to the output of comparator 412, the outputs of both AND gates 440 and 427 may never both indicate a fault. Effectively, AND gates 440 and 427 and comparators 412 and 413 ensure that the output signal of phase angle comparator 405 or the output signal of amplitude comparator 415 is transmitted to OR gate 455 to the exclusion of the other. Again, timer 425 may be configured to ensure that a signal transmitted by OR gate 455 is held for a predetermined amount of time prior to being output 430 to other system components, such as another IED or a breaker.

Figure 4B:
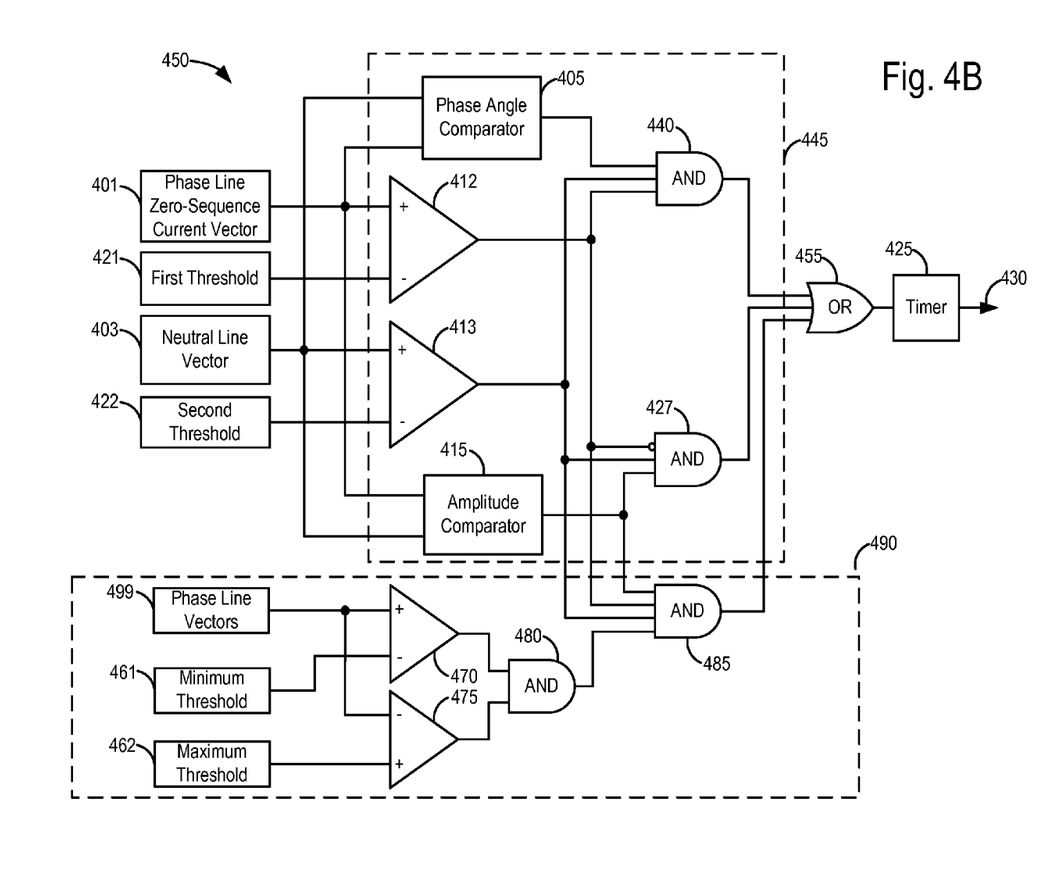
FIG. 4B illustrates one embodiment of a circuit diagram of a dual-comparator earth fault protection system, including a phase angle comparator, an amplitude comparator, and an in-zone fault detector.

FIG. 4B illustrates an exemplary circuit diagram of a REF protection system 450 that includes in-zone fault detector 490 together with REF protection subsystem 445. In-zone fault detector 490 includes comparator 470, which receives phase line vectors 499 as an input from current transformers in an electrical power delivery system and compares the value with a minimum threshold 461. Comparator 475 receives phase line vector 499 as an input and compares the value with a maximum threshold 462. The outputs of comparators 470 and 475 are received by AND gate 480. Thus, AND gate 480 asserts positive when phase line vectors 401 are between minimum threshold 461 and maximum threshold 462. AND gate 485 receives the output of AND gate 480. AND gate 485 asserts a signal indicating a fault when AND gate 480 asserts a signal, comparator 413 is positive, comparator 412 is positive, and amplitude comparator 415 indicates a fault.

According to some embodiments, AND gate 485 may additionally receive as an input the inverse of the output of AND gate 440. Accordingly, AND gate 485 may be configured to only assert a signal indicating a fault when AND gate 440 is not asserted. According to various embodiments, this may allow internal monitoring of REF protection system 450. For example, if output 430 indicates a fault, internal monitoring may be able to determine if the fault was detected using phase angle comparator 405, amplitude comparator 415, or in-zone fault detector 490.

OR gate 455 receives the output signals of AND gates 485, 440 and 427 and transmits a signal indicating a fault to timer 425 when at least one of AND gates 485, 440 and 427 indicates a fault. Again, timer 425 may be configured to ensure that a signal transmitted by OR gate 455 is held for a predetermined amount of time prior to being output 430 to other device to perform a control action.

Figure 5:
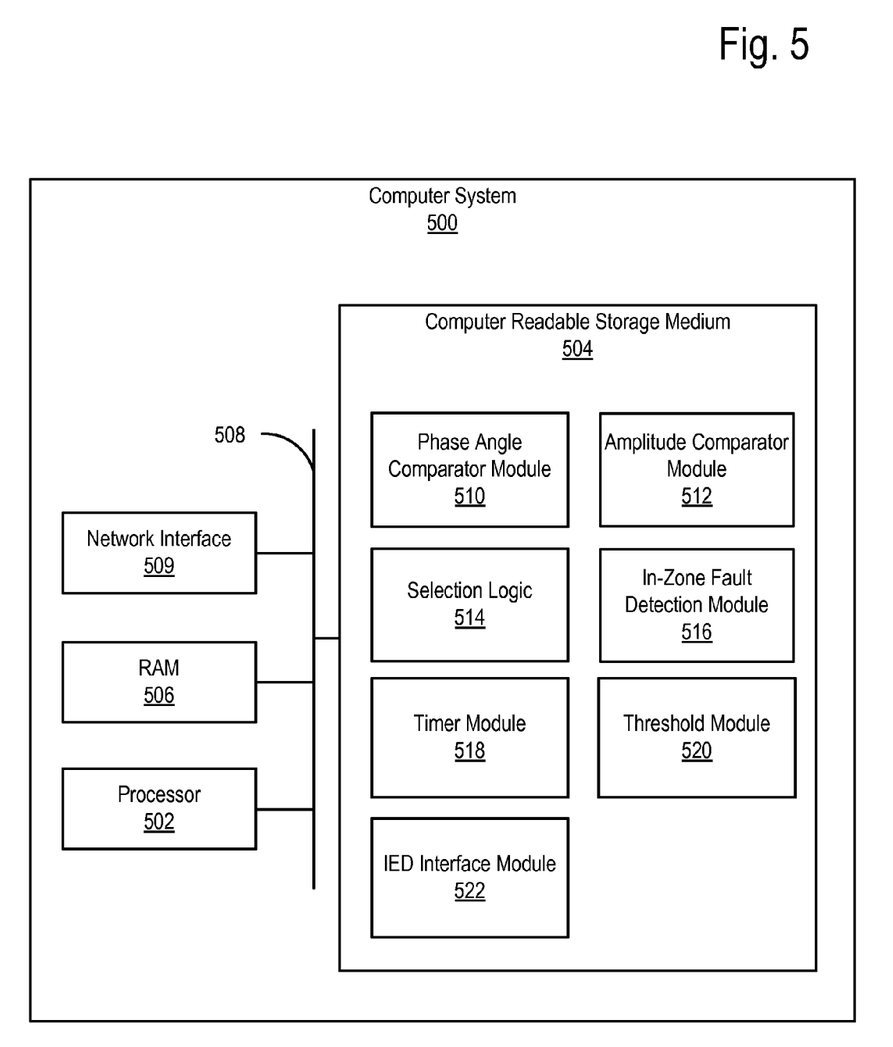
FIG. 5 is a functional block diagram of one embodiment of a computer system configured to provide restricted earth fault protection, using a phase angle comparator module, an amplitude comparator module, and an in-zone fault module.

FIG. 5 is a functional block diagram of an exemplary computer system 500 configured to provide REF protection using a phase angle comparator module 510, an amplitude comparator module 512, and an in-zone fault detection module 516. According to various embodiments, computer system 500 may be connected to an electrical power delivery system (not shown) via one or more current transformers (not shown) and may be configured to issue control instructions to monitored equipment.

According to various embodiments, computer system 500 may be embodied in an IED or a general purpose computer system. Additionally, an existing IED may be reconfigured using hardware, firmware, and/or software updates to implement the modules described in conjunction with FIG. 5.

Computer system 500 includes a processor 502, random access memory ("RAM") 506, and a network interface 509 connected to a computer-readable storage medium 504 via bus 508. Processor 502 may be embodied as a general-purpose processor, an application specific processor, a microcontroller, a digital signal processor, a field-programmable logic array, or the like. Processor 502 performs logical and arithmetic operations based on program code stored within computer-readable storage medium 504. Computer-readable storage medium 504 may comprise various modules executable on processor 502 for performing the various methods and features described herein. Exemplary modules include a phase angle comparator module 510, an amplitude comparator module 512, a selection logic module 514, an in-zone fault detection module 516, a timer module 518, a threshold module 520, and an IED interface module 522. Other embodiments may utilize more or fewer modules than are shown in FIG. 5, or alternatively multiple modules may be combined into a single module. In still other embodiments, the functionality provided by the various modules may be performed by subsystems, which may utilize a combination of hardware and software resources that are configured to implement the described functionality.

Computer system 500 may include a network interface 509 configured to communicate with a data network. Network interface 509 may be configured, in various embodiments, to use a variety of types of communication protocols (e.g., Ethernet, SONET, etc.) and physical media (Coaxial cable, twisted pair, fiber optic, etc.). Network interface 509 may be configured to receive input signals from other IEDs. The input signals may include representations of electrical conditions in an electric power delivery system. Input signals may include any of a wide variety of representations of electrical signals, including voltage and/or current vectors such as positive-sequence, negative-sequence, and/or zero-sequence vectors of the phase lines and/or the neutral lines.

Phase angle comparator module 510 may be configured to compare the phase angles, phasors, and/or other characteristics of input signals from an electrical power delivery system. According to various embodiments, phase angle comparator module 510 is configured to indicate a fault when the difference between a zero-sequence current vector of phase lines and a current vector of a neutral line exceeds a specified threshold. In various embodiments, the specified thresholds are included in threshold module 520.

Amplitude comparator module 512 may be configured to compare the amplitudes of input signals. According to various embodiments, amplitude comparator module 512 is configured to indicate a fault when a restraint current as a function of an operating current exceeds a specified threshold. The specified thresholds may be included in threshold module 520.

Selection logic module 514 may be configured to select the output signal of one of phase angle comparator module 510 and amplitude comparator module 512, to the exclusion of the other, based on the system conditions. For example, according to various embodiments, selection logic module 514 receives input signals from one or more current transformers in an electrical power delivery system and compares them to threshold values. The threshold values may be specified in threshold module 520. If the input signals, as compared to the threshold values, satisfy specified conditions then the output signal of phase angle comparator module 510 is transmitted to timer module 518. Otherwise, if the input signals are below the threshold values, then the output signal of amplitude comparator module 512 is transmitted to timer module 518.

In-zone fault detection module 516 may be configured to detect in-zone faults. In certain embodiments, in-zone fault detection module 516 may be configured to transmit a signal indicating a fault to timer module 518 when amplitude comparator module 512 indicates a fault and input signals from the electrical power delivery system are between a minimum threshold and a maximum threshold.

Timer module 518 may be configured to delay transmission of a signal transmitted indicating a fault for a specified amount of time prior to being output, or may require that a signal be asserted for a specified time period prior to being output. An output signal may be generated by timer module 518 that may result in one or more control actions in response to detecting a fault. According to alternative embodiments, a timer may not be required, such that output signals are not delayed or required to be asserted for a predetermined amount of time.

IED interface module 522 may be configured to communicate with IEDs in the electrical power delivery system. IED interface module 522 may process incoming communications from IEDs that include representations of electrical conditions in the electrical power delivery system. IED interface module 522 may also be configured to generate communications to be sent to IEDs that may contain instructions to be performed by and IED. For example, upon the detection of a fault, IED interface module 522 may generate an instruction to be sent to an IED to open a breaker in order to electrically isolate the location of the fault from other locations of the electrical power delivery system.

Figure 6A:
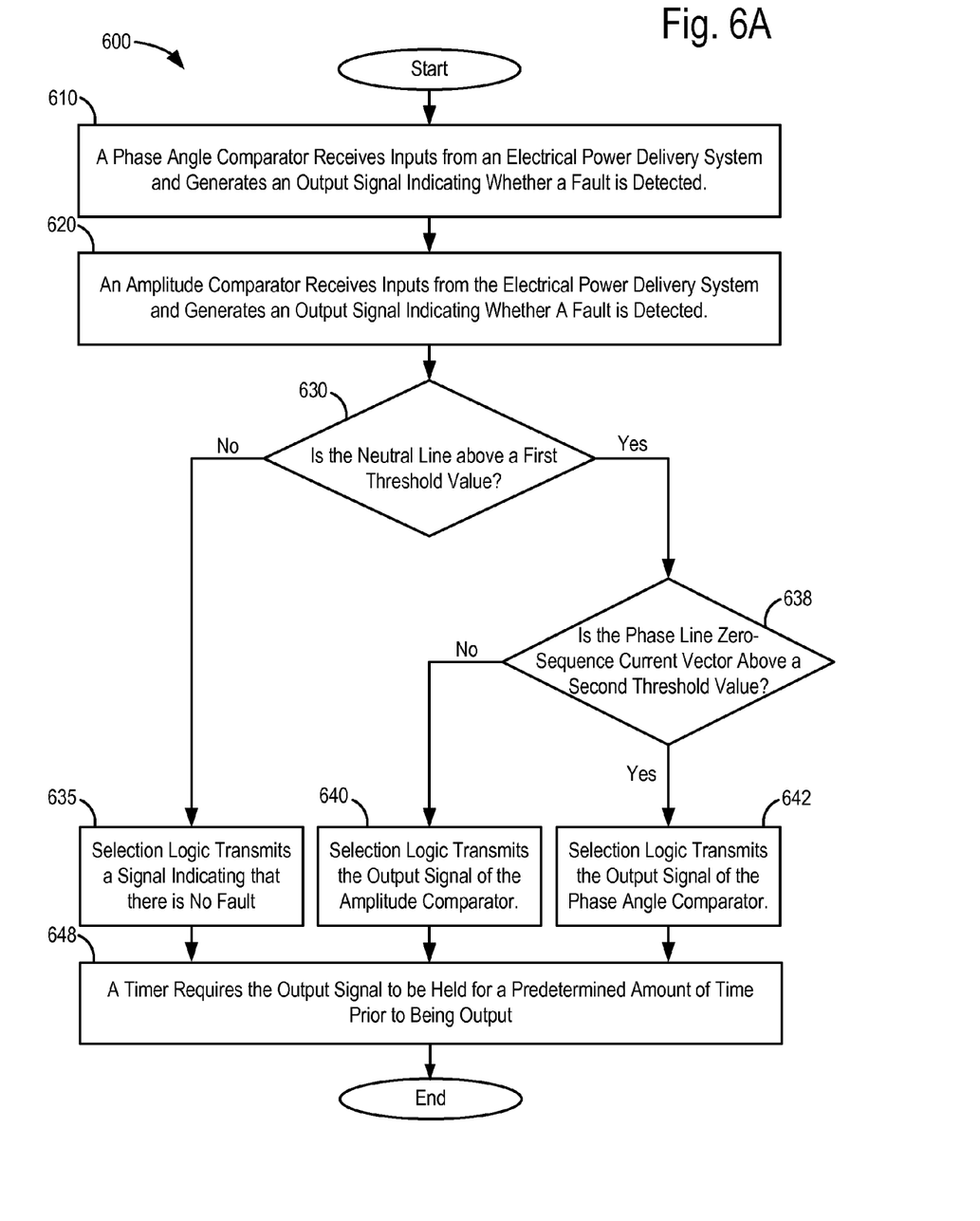
FIG. 6A is a flow chart of one embodiment of a method for providing restricted earth fault protection using an IED including a phase angle comparator and an amplitude comparator.

FIG. 6A is a flow chart of one embodiment of a method 600 for providing REF protection that uses a phase angle comparator and an amplitude comparator to detect faults depending on electrical conditions in an electrical power delivery system. According to various embodiments, one or more steps in the method 600 may be optional and/or performed out of order. A phase angle comparator receives inputs from the electrical power delivery system and generates an output signal indicating whether a fault is detected, at 610. Similarly, an amplitude comparator receives inputs from the electrical power delivery system and generates an output signal indicating whether a fault is detected, at 620. According to various embodiments, the inputs from the electrical power delivery system received by the amplitude comparator and the phase angle comparator may include a vector representation, an amplitude, a phase, a phasor, positive-sequence, negative-sequence, and/or zero-sequence current vectors of one or more phase lines and/or neutral lines.

If the neutral line is below a first threshold value, at 630, then selection logic may transmit a signal indicating that there is no fault, at 635. Otherwise, if the neutral line is above a first threshold value, at 630, and the phase line zero-sequence vector is above a second threshold, at 638, then the selection logic may transmit the output signal of the phase angle comparator to the timer, at 642. If the neutral line is above a first threshold value, at 630, and the phase line zero-sequence vector is below the second threshold, at 638, then selection logic may transmit the output signal of the amplitude comparator, at 640. Finally, the timer may be configured to ensure that a signal transmitted by the selection logic is held for a predetermined amount of time prior to being output to other system components, such as another IED or a breaker, at 648. According to alternative embodiments, the output of the selection logic may be directly transmitted to other system components, such as a breaker, without the use of a timer or other delay mechanism.

Figure 6B:
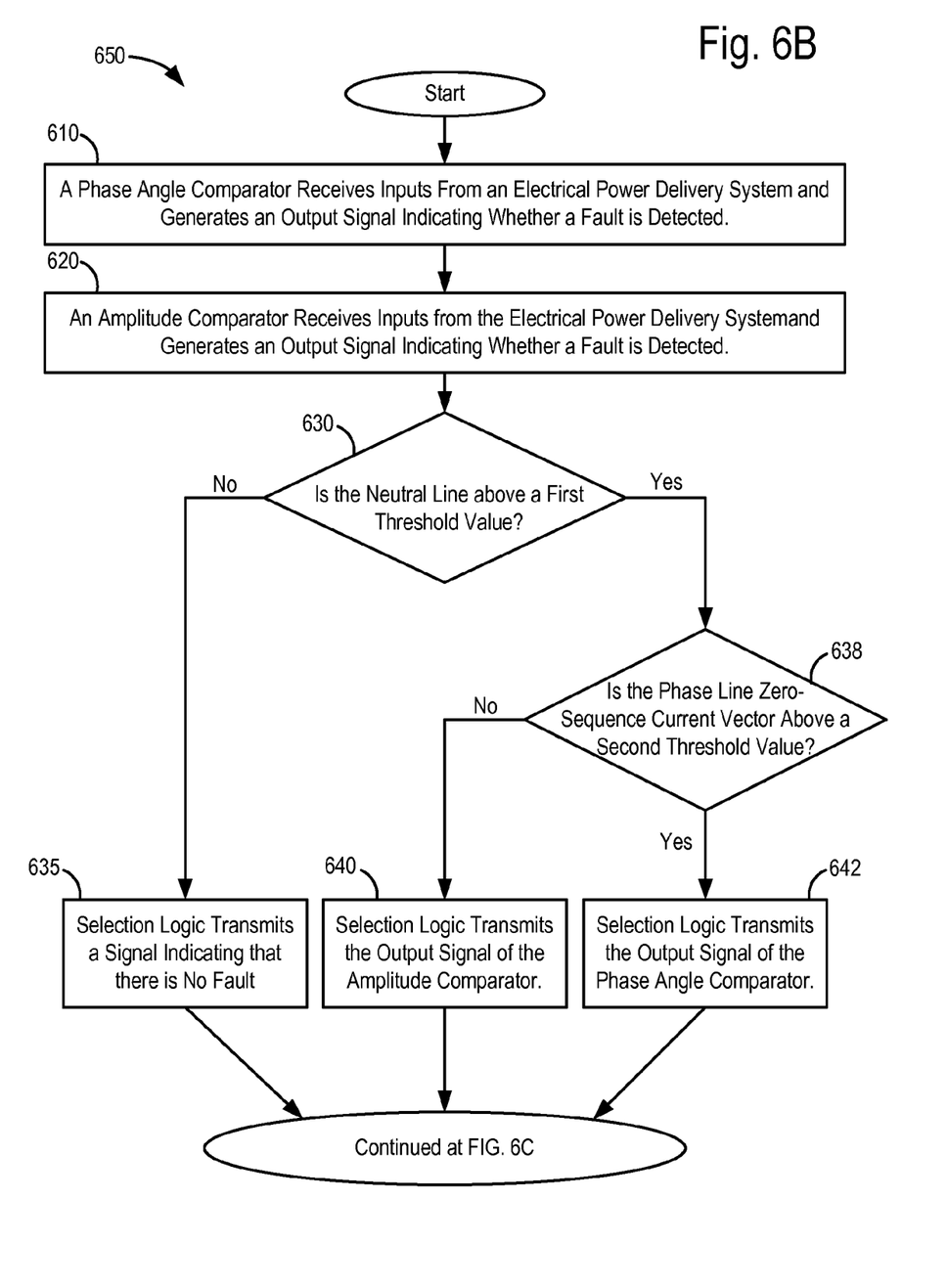
FIG. 6B is a flow chart of one embodiment of a method for providing restricted earth fault protection using an IED, by selecting the output of one of an amplitude comparator and a phase angle comparator, to the exclusion of the other.
Figure 6C:
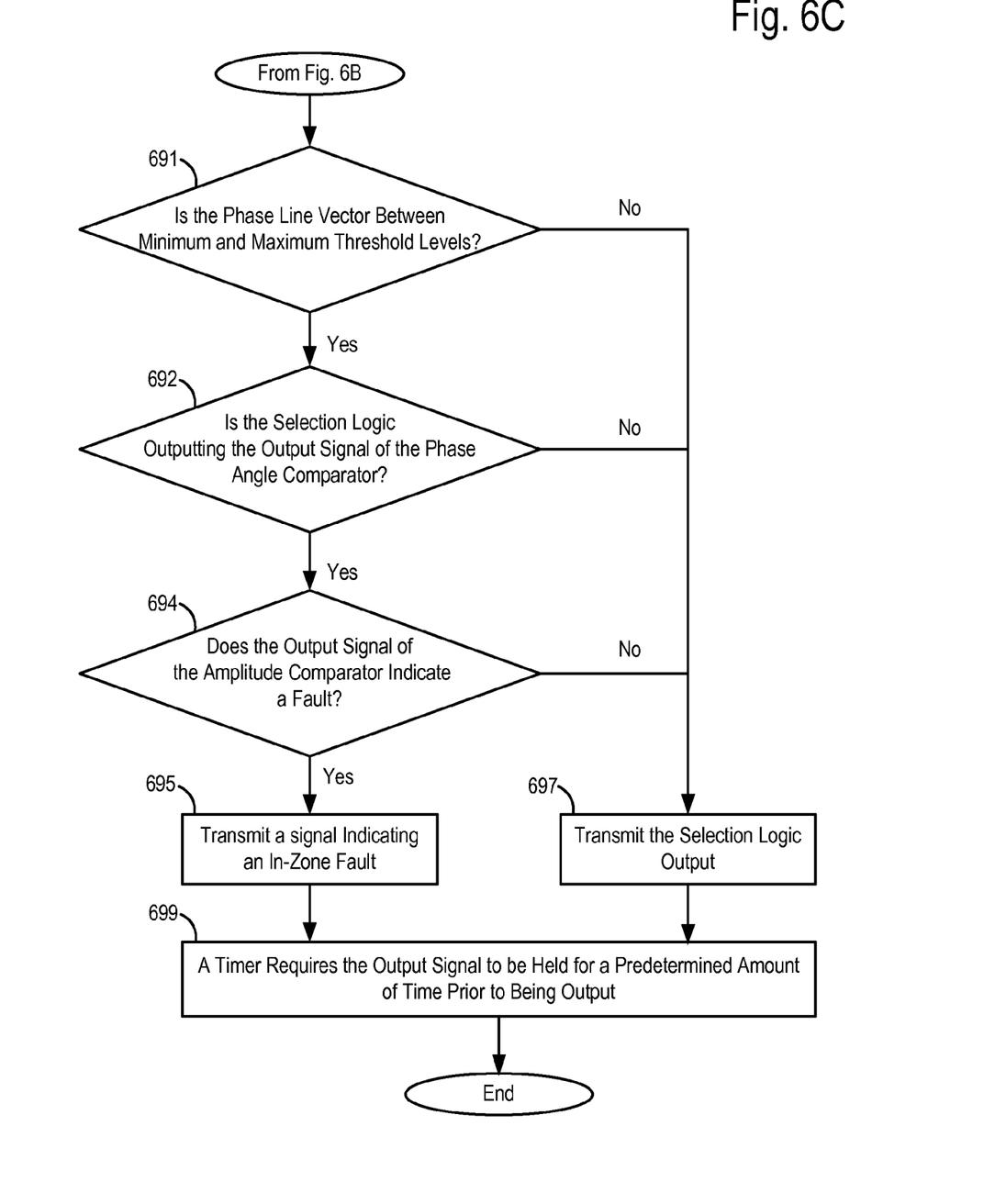
FIG. 6C is a continuation of the method of FIG. 6B and includes a flow chart of one embodiment of a method for detecting an in-zone fault.

FIGS. 6B and 6C provide an exemplary method 650 for providing REF protection including an in-zone fault detector. Again, a phase angle comparator receives inputs from an electrical power delivery system and generates an output signal indicating whether a fault is detected, at 610. An amplitude comparator receives inputs from the electrical power delivery system and generates an output signal indicating whether a fault is detected, at 620. According to various embodiments, the inputs from the electrical power delivery system received by the amplitude comparator and the phase angle comparator may include a vector representation, an amplitude, a phase, a phasor, positive-sequence, negative-sequence, and/or zero-sequence current vectors of one or more phase lines and/or neutral lines.

If the neutral line is below a first threshold value, at 630, then selection logic may transmit a signal indicating that there is no fault, at 635. Otherwise, if the neutral line is above a first threshold value, at 630, and the phase line zero-sequence vector is above a second threshold, at 638, then the selection logic may transmit the output signal of the phase angle comparator to the timer, at 642. If the neutral line is above a first threshold value, at 630, and the phase line zero-sequence vector is below the second threshold, at 638, then selection logic may transmit the output signal of the amplitude comparator, at 640.

Continued in FIG. 6C, the output of the selection logic may be transmitted to a timer only if an in-zone fault detector does not transmit a signal indicating an in-zone fault to the timer. Alternatively, an output of an in-zone fault detector and an output of selection logic are received by an OR gate, the OR gate configured to transmit a signal indicating a fault if either one or both of the in-zone fault detector and the selection logic indicate a fault.

As illustrated in FIG. 6C, if phase line vectors from an electrical power delivery system are not between minimum and maximum threshold levels, at 691, then the output from the selection logic of FIG. 6B is transmitted to a timer, at 697. According to one embodiment, if the selection logic is not transmitting the output signal of the phase angle comparator, at 692, then the output from the selection logic is transmitted to the timer, at 697.

Additionally, if the amplitude comparator does not indicate a fault, at 694, then the output of the selection logic is transmitted to the timer, at 697. However, if the inputs from the electrical power delivery system are between a minimum and a maximum threshold level, at 691, the selection logic is transmitting the output signal of the phase angle comparator, at 692, and the amplitude comparator indicates that there is a fault, at 694, then an in-zone fault detector may transmit a signal indicating an in-zone fault to the timer, at 695. According to various embodiments, the output of an in-zone fault detector and the output of selection logic are transmitted to an OR gate and if output indicates a fault the OR gate transmits a signal indicating a fault to a timer. Finally, the timer may be configured to ensure that a signal transmitted by selection logic and/or in-zone fault detector is held for a predetermined amount of time prior to being output to other system components, such as another IED or a breaker, at 699.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

What is claimed:

1. An intelligent electronic device (IED) for providing restricted earth fault protection comprising:
   a phase angle comparator configured to receive an input comprising a vector representing electrical conditions associated with a plurality of phases of a mufti-phase electrical power delivery system and a vector representing electrical conditions associated with a neutral line of the mufti-phase electrical power delivery system, to determine a phase angle difference between the input and a phase angle reference, and to selectively generate a phase angle comparator fault indicator based on the phase angle difference with respect to a phase angle deviation threshold;
   an amplitude comparator configured to receive the input and to selectively generate an amplitude comparator fault indicator based on the input with respect to an amplitude threshold; and
   selection logic configured to generate a selection logic output corresponding to one of the phase angle comparator fault indicator and the amplitude comparator fault indicator, to the exclusion of the other, based on a selection logic threshold, and the input from the mufti-phase electrical power delivery system.

2. The IED of claim 1, wherein the vector representing electrical conditions associated with the plurality of phases associated with the multi-phase electrical power delivery system comprises a zero-sequence current vector calculated from the currents of each phase in a three phase power system.

3. The IED of claim 1, wherein the input representing electrical conditions associated with a mufti-phase electrical power delivery system comprises a vector representing current.

4. The IED of claim 1, further comprising:
   in-zone fault detection logic configured to selectively generate an in-zone fault detection signal based on the input with respect to the amplitude comparator fault indicator, a first threshold, and a second threshold, the first threshold and the second threshold comprising boundaries of an in-zone fault range.

5. The IED of claim 4, wherein the first threshold is a minimum load current and the second threshold is a maximum current transformer saturation current.

6. The IED of claim 1, further comprising a timer, the timer comprising a timer output and a timer input, wherein the timer input is configured to receive the selection logic output, to determine that the selection logic output remains asserted for a specified period of time, and the timer is configured to selectively transmit the timer input to the timer output.

7. The IED of claim 1, wherein the selection logic threshold comprises a ratio of a measured current to a nominal current.

8. The IED of claim 1, further comprising IED interface logic configured to generate communications to be sent to a plurality of IEDs that contain instructions to be performed by one of the plurality of IEDs.

9. A method for providing restricted earth fault protection using an intelligent electronic device (IED) comprising:
   receiving an input from a mufti-phase electrical power delivery system;
   generating a vector representing electrical conditions associated with a plurality of phases of the mufti-phase electrical power delivery system;
   generating a vector representing electrical conditions associated with a neutral line of the mufti-phase electrical power delivery system;
   determining a phase angle difference between the input and a phase angle reference;
   generating a phase comparator fault indicator using a phase angle comparator based on the phase angle difference with respect to a phase angle threshold;
   generating an amplitude comparator fault indicator using an amplitude comparator based on the input with respect to an amplitude threshold; and
   generating a selection logic output using selection logic, the selection logic output corresponding to one of the phase angle comparator fault indicator and the amplitude comparator fault indicator, to the exclusion of the other, based on a selection logic threshold, and the input from the electrical power delivery system.

10. The method of claim 9, further comprising:
    representing the electrical conditions associated with the plurality of phases of the mufti-phase electrical power delivery system using a zero-sequence current vector calculated from the currents of each phase in a three phase power system.

11. The method of claim 9, wherein the vector representing electrical conditions associated with the plurality of phases of the mufti-phase electrical power delivery system comprises a vector representing current.

12. The method of claim 9, further comprising:
generating an in-zone fault detection signal based on the input with respect to a first threshold and a second threshold, the first threshold and the second threshold comprising boundaries of an in-zone fault range, and the amplitude comparator fault indicator.

13. The method of claim 12, wherein the first threshold is a minimum load current and the second threshold is a maximum current transformer saturation current.

14. The method of claim 9, further comprising:
receiving the selection logic output using a timer input;
determining that the selection logic output remains asserted for a specified period of time; and
selectively transmitting the timer input to the timer output.

15. The method of claim 9, wherein the selection logic threshold comprises a ratio of a measured current to a nominal current.

16. The method of claim 9, further comprising generating communications to be sent to a plurality of IEDs that contain instructions to be performed by one of the plurality of IEDs.

17. A computer system in an intelligent electronic device (IED) to identify faults in an electrical power delivery system, the computer system comprising:
a processor; and
a computer-readable storage medium in communication with the processor, the computer-readable storage medium comprising:
a phase angle comparator module executable on the processor, the phase angle comparator module configured to receive an input comprising a vector representing electrical conditions associated with a plurality of phases of a mufti-phase electrical power delivery system and a vector representing electrical conditions associated with a neutral line of the multi-phase electrical power delivery system, and selectively generate a phase angle comparator fault indicator;
an amplitude comparator module executable on the processor, the amplitude comparator module configured to receive the input and selectively generate an amplitude comparator fault indicator; and
a selection logic module executable on the processor, the selection logic module configured to selectively transmit one of the phase angle comparator fault indicator and the amplitude comparator fault indicator to the exclusion of the other, based on a first threshold and the input from the electrical power delivery system.

18. The computer system of claim 17, wherein the computer-readable storage medium further comprises:
an in-zone fault logic module executable on the processor, configured to selectively generate an in-zone fault detection signal based on the input with respect to the amplitude comparator fault indicator, a first threshold, and a second threshold, the first threshold and the second threshold comprising boundaries of an in-zone fault range.

19. The computer system of claim 17, wherein the computer-readable storage medium further comprises a timer module executable on the processor, to receive the selection logic output and to determine that the selection logic output remains asserted for a specified period of time, and to selectively transmit the selection logic output.

20. The computer system of claim 17, wherein the computer-readable storage medium further comprises an IED interface module executable on the processor, IED interface logic configured to generate communications to be sent to a plurality of IEDs that contain instructions to be performed by one of the plurality of IEDs.

* * * * *